Jan. 3, 1967 T. H. RAMSEY, JR., ETAL 3,296,359

DIELECTRICS WITH CONDUCTIVE PORTIONS AND METHOD OF MAKING SAME

Filed Dec. 31, 1964

INVENTORS:
THOMAS H. RAMSEY, JR.
STANLY B. RICE, JR.
William D. Harris, Jr.
ATTORNEY United States Patent Office 3,296,359

Patented Jan. 3, 1967

3,296,359

DIELECTRICS WITH CONDUCTIVE PORTIONS AND METHOD OF MAKING SAME

Thomas H. Ramsey, Jr., Dallas, and Stanly B. Rice, Jr., Garland, Tex., assignors to Texas Instruments Incorporated, Dallas, Tex., a corporation of Delaware Filed Dec. 31, 1964, Ser. No. 422,600

9 Claims. (Cl. 174—68.5)

This invention pertains to dielectrics with metalized or conductive portions, and to methods related to the making of same.

Copending United States patent application Serial Number 398,480, entitled "Dielectric Bodies With Selectively Formed Conductive or Metallic Portions, Composites Thereof With Semiconductor Material, and Methods of Making Said Bodies and Composites," filed September 18, 1964, assigned to the assignee of the present invention, describes methods of forming conductive zones on a dielectric body and structure, e.g. circuit boards, made by such methods. It has now been found that techniques similar to those described therein may be employed in forming conductive zones on a body made of magnesium oxide or of a magnesium silicate. Though the techniques are similar, the type action occurring on a magnesium oxdie or a magnesium silicate body as a result of such techniques appears to be rather different from that occurring on the yttrium iron garnet type materials described in the said prior application. Thus, an electron beam activates regions of a body of magnesium oxide or of a magnesium silicate, but it does not chemically change it to an observable degree. Surprisingly, the regions exposed to an electron beam preferentially plate, as with nickel, by electroless plating technique. Moreover, it has been found that aluminum can be reacted with substrates or bodies of magnesium oxide or of a magnesium silicate to form a relatively conductive, integral region which includes a comparatively conductive compound of the aluminum and the substrate.

Circuit board substrates and certain other ceramic bodies often require intricate patterns of channels, ridges, etc. Prior art techniques usually form these patterns by scribing the ceramic body or by pressing with a die formed by customary shop machining practices. Both techniques are rather cumbersome and expensive when intricate patterns are required.

It is an object of the present invention to provide a magnesium oxide or a magnesium silicate body having conductive zones or regions thereon (e.g. circuit boards) and to provide methods for making such a body.

In accordance with the present invention a body is provided which comprises a dielectric portion of magnesium oxide or of a magnesium silicate. The body includes metal intimately bonded to the dielectric portion through an activated, relatively metal-accepting region. In a preferred embodiment, the body is a circuit board and the metal is a circuit path thereon.

The present invention further includes a method of forming a conductive portion intimately bonded to a circuit body made of magnesium oxide or a magnesium silicate. The method comprises selectively treating a region of the body to activate the region for acceptance of metal relative to untreated portions of the body; and joining metal to the body through a bond which includes the activated region.

In accordance with a preferred embodiment, metal is joined to the body in a desired region by first selectively treating the region by bombarding it with an electron beam. Thereafter, metal is preferentially plated on the treated region.

For a more complete understanding of the present invention and for further objects and advantages thereof, reference may now be had to the following description taken in conjunction with the accompanying drawings in which.

Figure 1:
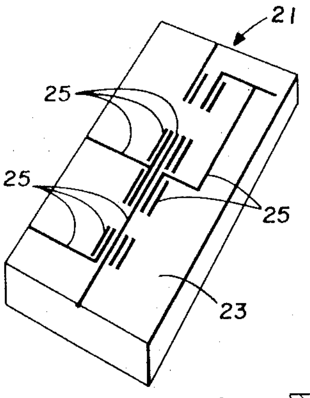
FIGURE 1 is a pictorial view illustrating a circuit board carrying circuit paths formed thereon in accordance with the present invention.
Figure 2:
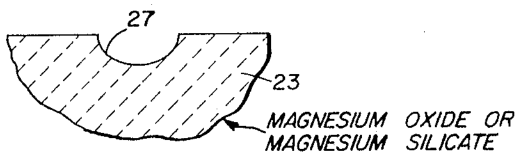
FIGURES 2–5 are schematic, partial sectional views sequentially illustrating the method of forming a circuit path of the type carried on the circuit board of FIGURE 1.

Referring now to FIGURE 1, therein is illustrated a circuit board of the so-called "printed circuit" type, which is made in accordance with an aspect of the present invention. The circuit board, indicated generally by the numeral 21, includes the dielectric substrate 23 and the conductive paths 25 on the upper face of the substrate 23. These paths may take a multiplicity of patterns, that of FIGURE 1 being merely illustrative. The paths 25 are preferably plated with metal, for example, nickel, over activated zones in accordance with the present invention; however, under some conditions the plating may be omitted and the comparatively conductive surface zones themselves used as the conductive paths.

Those skilled in the art will appreciate many uses which may be made of a circuit board of the general nature of 21. For example, semiconductor network packages may be interconnected in desired circuit positions on the board, with the leads from the packages attached to the conductive paths. In view of the metallic nature of the paths, and of their extremely strong structural adherence with the substrate 23, the leads from a semiconductor package may be welded, as well as soldered, to the paths to produce a connection of high electrical and structural integrity.

The substrate of FIGURE 1 is made of a magnesium oxide body, or of a magnesium oxide-silicon dioxide body, hereinafter referred to as a magnesium silicate body. Examples of bodies made of magnesium silicate are steatite ($MgO \cdot SiO_2$) and forsterite ($2MgO \cdot SiO_2$). The structural nature of the various magnesium oxide-silicon dioxide bodies may vary over a wide range, and any one of these compositions appears to be suitable and operative for practice of the present invention.

A method of making the circuit board of FIGURE 1 is sequentially illustrated in FIGURES 2–5. First, channels or depressions 27 are formed in the desired locations in the upper surface of the substrate 23 in accordance with the desired pattern which the circuit paths ultimately produced are to have. Scribing and etching through a mask are two ways in which the channels 27 may be formed in substrate 23. Another method, utilizing a die having desired configuration, will be discussed at a later point herein.

Figures 3, 4:
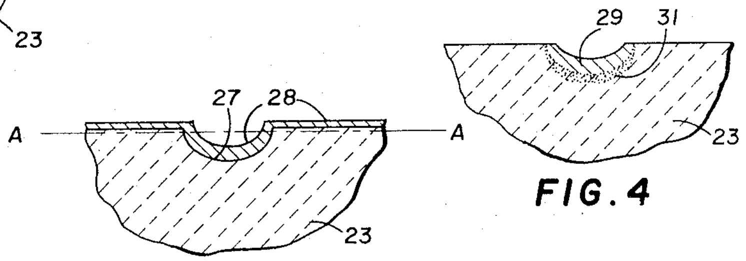
Figure 5:
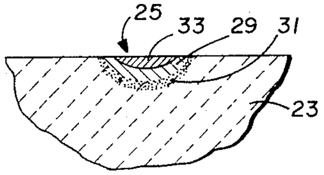

The next step involves the deposition of aluminum in the channels 27. This may be accomplished in various ways, for example, by deposition of aluminum on the substrate surface by means of aluminum evaporation techniques or by painting a film of aluminum in the channels 27. As an example of the latter technique, a slurry is made of aluminum powder of minus 325 mesh particle size, and an evaporable carrier, e.g. ethylene glycol, pine oil, etc. A commercially available material which may be utilized as a suitable carrier is Du Pont H220, made by the Du Pont company. The slurry is painted over the upper surface of substrate 23, with particular effort being made to place slurry within the channels 27. The appearance of the circuit board at this stage of the processing is schematically illustrated in FIGURE 3. Note the film of aluminum powder slurry 28 on the upper surface of substrate 23.

The upper surface regions of the circuit boards are removed, as by cutting, grinding, etc. so that aluminum is left only within the channels 27. Referring to FIGURE 3, it will be seen that the region above the cutting plane designated A—A represents the portion of the body to be removed in this step.

The in-process body, containing aluminum in the channels 27, is then fired at an elevated temperature, e.g. at about 900° C. for about one hour. The firing step is preferably conducted in an inert atmosphere, e.g. argon, helium, carbon dioxide or the like. The temperature of firing should exceed the melting point of aluminum (660° C.) in order to achieve desired chemical interaction between the aluminum and the substrate material.

After firing, slag is removed, as by sand blasting or by scribing in the channels. The appearance of the product at this stage of processing is represented in FIGURE 4. Aluminum path 29 is tightly and intimately bonded to the substrate 23 through the activated or transition region 31, which forms by chemical reaction between the adjacent aluminum and substrate regions in the course of firing. While it is not desired to be bound by any theory herein, it appears that this transition region consists, at least in part, of a chemical structure which is formed between the aluminum and the magnesium oxide or a magnesium silicate. It further appears that the transition region is graded from a composition of non-metallic character, contiguous with the substrate material, to a composition of highly metallic character, adjacent the pure aluminum portion of aluminum path 29.

For many applications, it is desirable that nickel or other metal be bonded to the aluminum path 29. This may be accomplished by electroless plating, which preferentially occurs on the aluminum path 29 when the substrate 23 is immersed in a plating solution for plating reaction. While electroless plating solutions and techniques are well-known, the following solution and technique is given as an example: The initial solution contains 3% of $NiCl_2 \cdot 6H_2O$, 1% of $NaH_2PO_2 \cdot H_2O$, 5% of $NH_4Cl$, 10% of $C_6H_5O_7Na_3 \cdot 2H_2O$, and 81% of $H_2O$ (all percentages being by weight). To 100 volumes of the foregoing solutions, 5 volumes of $NH_4OH$ are added and the solution is heated to 95° C. at which time 5 more volumes of $NH_4OH$ are added. The circuit board is immersed in the solution which is maintained at 95° C. Thereafter every six minutes 2 volumes of $NH_4OH$ are added in order to replace loss. After about one-half hour, or longer, depending on the desired amount of plated nickel, the circuit board is removed and washed with water and alcohol and then air dried. The resulting product is a circuit board of the nature illustrated in FIGURE 1. To this board, metallic leads may be welded, soldered, or joined by other desired means. The circuit paths form an extremely strong bond with the circuit board, apparently because the activated or transition region 31 is of a chemical structure including both aluminum and substrate material.

The technique of forming circuit boards to conductive paths by chemical reaction of aluminum with the substrate is not limited to substrates having channels. A masking material may be disposed on a substrate face to leave a desired pattern of exposed substrate. Thereafter, aluminum may be disposed on the exposed regions and reacted therewith in accordance with the procedure previously explained herein.

Figure 6:
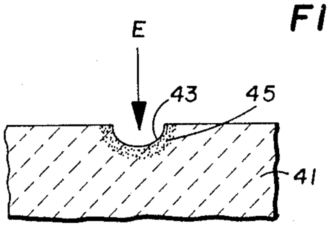
FIGURES 6 and 7 are schematic partial sectional views illustrating the sequential steps of an alternative method of forming circuit paths of the nature of those carried on the circuit board of FIGURE 1.
Figure 7:
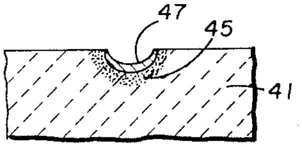

A circuit of the general nature illustrated in FIGURE 1 may be made by a rather different technique. In accordance with this technique, an electron beam or other concentrated energy source is impinged on selected surface regions of the magnesium oxide or magnesium silicate body in accordance with a predetermined pattern. The beam activates the material locally in the regions of exposure in such a manner that these localized regions or zones become relatively receptive to metal in an electroless plating operation. Thus, a body having regions in accordance with a predetermined pattern which have been exposed to a high energy source such as an electron beam can be electrolessly plated in nickel and the nickel plates preferentially on the activated regions. This process is schematically illustrated in FIGURES 6 and 7. Referring to FIGURE 6, the substrate 41 is illustrated during the process of exposure to a concentrated energy source E, for example, an electron beam. The concentrated energy source forms a small depression or channel 43 in the body in the regions of exposure. The surface regions bounding this channel and extending inwardly a short distance are in some manner activated by the concentrated energy source to cause the surface of the channel 43 to be relatively receptive to metal during an electroless plating operation. The nature of the activation is not known. Examination of the body by various means does not reveal any materially changed nature of the activated region, compared to the rest of the body. For example, the conductivity of the activated region appears to be substantially the same as the conductivity of the surrounding body. The only change indicated by microscopic examination is a change in texture in the exposed region of the channel wherein material was made molten by the electron beam. Certainly, it is believed that some change must occur, otherwise preferential plating could not be accomplished. Perhaps this change is an extremely subtle chemical change, or perhaps the activation is caused by the relatively minor physical change involved in the process. In any event, the exposure to a concentrated energy source, e.g. an electron beam, produces activation in the regions of exposure. The activated region is schematically illustrated in FIGURES 6 and 7 by the numeral 45.

After formation of activated region 45, the substrate 41 is immersed in a plating solution and electrolessly plated. The same nickel plating solution referred to previously herein may be used if desired. The plating time is somewhat longer, e.g. upwards from one hour. The appearance of the resulting product is illustrated schematically in FIGURE 7 wherein the plated nickel path 47 is schematically illustrated as bonded to the substrate 41 through the activated region 45.

Figure 8:
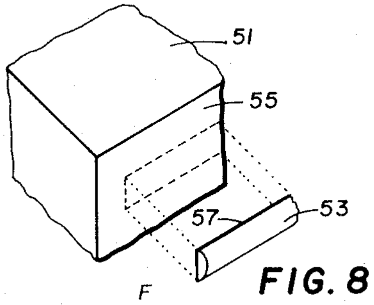
FIGURE 8 is a pictorial exploded view illustrating a portion of die apparatus in accordance with the present invention.

FIGURE 8 is a partial, exploded pictorial view of a die 51 which may be used to form a pattern in a ceramic body, for example, in forming channels in a substrate such as 23 illustrated in FIGURE 1. The die 51 carries a plurality of rodlike die projections, exemplified by the rod member 53 in FIGURE 8, securely joined to and extending outwardly from die face 55. The rodlike projections may have various cross-sectional shapes, the semi-circular configuration of the rod member 53 being preferred. The rodlike die projections are bonded to the die face by a suitable adhesive. For example, the rod member 53 is bonded to die face 55 by epoxy resin 57. Although any metal-to-metal bonding adhesive may be used, it is preferred that the adhesive be readily soluble in a solvent which is non-deleterious to the materials of construction of the die and die projections, which are preferably made of a high grade of tool steel.

The size of a die projection such as rod member 53 may be varied over a wide range. As a specific example, the rod member 53 of FIGURE 8 may be formed of tool steel drill rod of approximately 13 mil diameter. The rod is lapped to make it semicylindrical. Thereafter, epoxy resin 57 is applied to the flat side portion of the rod member 53 and it is glued to die face 55 in a predetermined desired location. In general, a plurality of rods cut to various lengths will be placed on the die face in this manner in order to form a desired pattern.

Figure 9:
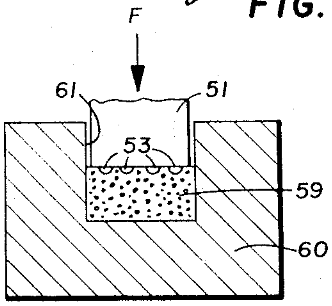
FIGURE 9 is a sectional, elevational view showing the molding of a ceramic body utilizing the die apparatus of the type illustrated in FIGURE 8.

After the bonding or gluing step has been completed, the die is readily for use in molding magnesium silicates, magnesium oxide, or other ceramic materials, as is illustrated in FIGURE 9. Therein a mass of 40–100 mesh steatite particles 59 contained within the female mold or die 60 is being formed into a ceramic body, with desired predetermined surface channels, by means of the die 51. It will be noted that the die 51 carries a plurality of die projections or rod members 53 extending downwardly from its die face. The die 51 mates with an opening 61 in the mold 60 and is pressed downwardly in that opening by a force F to cause the die face, including the rod members 53, to engage the particle mass 59 and form it into the desired shape, including a channel pattern conforming to the pattern of arrangement of the rod members 53 on the face of die 51. The pressure of molding may be, for example, about 10,000 to 15,000 p.s.i., between the die face and particle mass.

After forming a body in acordance with the desired shape imparted by the mold 60 and engaging portions of the die 51, resulting steatite body is fired in a suitable oven or furnace at an elevated temperature, e.g. at about 1300° C. for about 10 hours. On cooling, the steatite body having channels formed therein in accordance with a desired, predetermined pattern is obtained. This product may then be used for the process previously described herein in connection with FIGURES 2–5.

If it is desired to change the pattern of projections carried by the die face 55 of die 51, the bond between the rod members 53 and the die face 55 is dissolved by a suitable solvent. If epoxy resin is used as the bonding agent, then trichloroethylene, acetone, etc. may be used to loosen or dissolve the epoxy and clean it from the die face 55. Thereafter, rodlike members 53 may be bonded by adhesive to the die face 55 in accordance with a different desired pattern.

Figure 10:
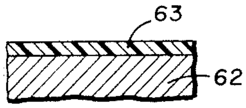
FIGURES 10–12 are schematic, partial sectional views sequentially illustrating an alternative method of forming die apparatus in accordance with the present invention.
Figure 11:
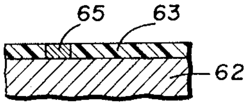
Figure 12:
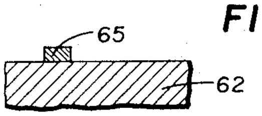

Another means for making a suitable die for forming depressions in ceramic bodies, for example, those of magnesium oxide, steatite, and forsterite, is sequentially illustrated in FIGURES 10–12. First the tool steel die body 61 has its face covered by a layer of masking material 63. Thereafter portions of masking material 63 are removed in accordance with a desired pattern in order to expose preselected regions of the face of die body 61. The exposed regions are then plated, for example, by electroplating technique from a standard nickel plating solution to adhere metal projections to the die face in the preselected regions. The projection 65, illustrated in FIGURES 11 and 12, is exemplary of such a plated region. After the plating is completed the protective film 63 is removed. The resulting die, schematically illustrated in FIGURE 12, comprises a die 61 having projections such as 65 extending from its face 67 in accordance with a predetermined pattern. If desired, the sharp edges of the projection 65 may be rounded off. Thereafter, the die 61 may be used in similar manner to the die 51, discussed in connection with FIGURE 9.

A preferred technique of forming projections such as 65 on die 61 utilizes a thin film of photoresist as a masking material. The photoresist is exposed in accordance with a desired pattern and the exposed or non-exposed regions (depending on whether the photoresist is of the positive or negative type) is removed by a selective solvent. Plating is then conducted to deposit metal projections on the die face. Thereafter, a suitable solvent is used to remove the photoresist masking material.

One example of photoresist is the type material produced and marketed by Azoplate Corporation under the tradenames AZ–17 and AZ–1350. This type material is of the so-called positive resist type. Regions exposed to ultraviolet light can be easily and selectively removed by acetone. Stripping agents for removal of the non-exposed regions are well-known in the art.

Another example of photoresist is the material sold by the Eastman Kodak Company under the tradename KMER. This material is of the so-called negative type. Regions of it which are exposed to ultraviolet light are resistant to certain solvents, for example, a light chlorinated solvent, e.g. trichloroethylene and others available through Eastman Kodak Company. Thus, non-exposed regions are removed by such a selective solvent. After plating is conducted, the exposed photoresist is removed by a suitable solvent. Such solvents are well-known in the art. An example comprises a hot mixture of sulfuric acid and nitric acid.

It is seen that the present invention provides a dielectric body having a conductively-formed portion. The conductively-formed portion may be made either by reacting aluminum with a magnesium oxide or magnesium silicate body, preferably followed by plating or by exposing regions of the body to a concentrated energy source, such as an electron beam, in accordance with a desired, predetermined pattern, followed by plating of the activated regions with a metal, e.g. nickel. The plating occurs preferentially on the activated regions when the body is immersed in an electroless plating solution.

Moreover, the present invention provides methods of making apparatus having utility in forming ceramic bodies, such as circuit boards made of steatite, forsterite, or other ceramic materials, with channels or other recessed portions disposed in accordance with a predetermined pattern. The apparatus consists of a die having projections attached thereto either by an adhesive or by plating.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of forming a conductive portion intimately bonded to a ceramic body made of a material selected from the group consisting of magnesium oxide and magnesium silicates comprising:

selectively treating a region of said body with a concentrated energy source to activate said region for acceptance of metal, relative to untreated portions of said body; and electrolessly plating metal on said region activated for acceptance of metal.

2. The method of claim 1 wherein said body is made of magnesium oxide.

3. The method of claim 1 wherein said body is made of a magnesium silicate.

4. The method of claim 3 wherein said body is forsterite.

5. The method of claim 3 wherein said body is steatite.

6. The method of claim 1 wherein the said electrolessly plating with a metal comprises electrolessly plating with nickel.

7. The method of claim 1 wherein said body is selectively treated with an electron beam.

8. The product made by the method of claim 1.

9. The method of forming a conductive portion intimately bonded to a ceramic body made of material selected from the group consisting of magnesium oxide and magnesium silicates comprising:

selectively treating a region of said body with an electron beam to activate said region for acceptance of metal, relative to untreated portions of said body; and joining electrolessly plated metal to said body through a bond comprising said activated region.

(References on following page)

References Cited by the Examiner

UNITED STATES PATENTS

| | | | |
|---|---|---|---|
| 2,597,562 | 5/1952 | Blodgett | 117—215 |
| 2,993,815 | 7/1961 | Treptow | 117—119 X |
| 2,994,846 | 8/1961 | Quinn. | |
| 2,996,401 | 8/1961 | Welch et al. | 117—123 X |
| 3,056,881 | 10/1962 | Schwarz. | |
| 3,080,261 | 3/1963 | Fritts et al. | 117—212 |
| 3,118,788 | 1/1964 | Hensler | 117—212 |
| 3,146,125 | 8/1964 | Schneble et al. | |
| 3,207,838 | 9/1965 | McCormack | 174—68.5 |

FOREIGN PATENTS

| | | |
|---|---|---|
| 211,530 | 2/1924 | Great Britain. |

LARAMIE E. ASKIN, *Primary Examiner.*

D. L. CLAY, *Assistant Examiner.*